United States Patent [19]

Morris et al.

[11] Patent Number: 5,003,619
[45] Date of Patent: Mar. 26, 1991

[54] METHOD AND APPARATUS FOR ADJUSTING THE POWER OF A TRANSMITTER

[75] Inventors: James P. Morris; Karl R. Weiss, both of Sunrise; Jaime A. Borras, Hialeah, all of Fla.

[73] Assignee: Motorola, Inc., Schaumburg, Ill.

[21] Appl. No.: 304,301

[22] Filed: Jan. 31, 1989

[51] Int. Cl.$^5$ .............................................. H04B 7/00
[52] U.S. Cl. ...................................... 455/69; 455/127; 455/343
[58] Field of Search .................... 455/127, 69, 116, 67, 455/117, 343

[56] References Cited

U.S. PATENT DOCUMENTS

| | | | |
|---|---|---|---|
| 3,732,496 | 5/1973 | Boyer | 455/69 |
| 3,898,390 | 8/1975 | Wells et al. | 179/41 A |
| 3,906,166 | 9/1975 | Cooper et al. | 179/41 A |
| 4,495,648 | 1/1985 | Giger | 455/69 |
| 4,556,760 | 12/1985 | Goldman | 179/2 EB |
| 4,580,262 | 4/1986 | Naylor et al. | 455/69 |
| 4,696,027 | 9/1987 | Bonta | 379/60 |
| 4,777,653 | 10/1988 | Bonnerot et al. | 455/69 |
| 4,868,795 | 9/1989 | McDavid et al. | 455/69 |
| 4,870,698 | 9/1989 | Katsuyama et al. | 455/127 |

FOREIGN PATENT DOCUMENTS 0105624  4/1989  Japan .................................. 455/69

Primary Examiner—Reinhard J. Eisenzopf
Assistant Examiner—Kinfe-Michael Negash
Attorney, Agent, or Firm—Thomas G. Berry; Pablo Meles

[57] ABSTRACT

The initial transmission (108) from one subscriber to another subscriber is transmitted at full power. The receiving unit measures the received signal strength and returns a code (118) representing this value in a reply message (114), which is also transmitted at full power. The signal strength of the reply message is determined and may be sent to the replying subscriber unit in a subsequent transmission (122), which may now be accomplished at a reduced power level. Thereafter, both subscribers may modify their respective transmitter power levels during subsequent transmission to minimize battery consumption and maximize the operational life of the subscriber unit.

10 Claims, 5 Drawing Sheets

METHOD AND APPARATUS FOR ADJUSTING THE POWER OF A TRANSMITTER

TECHNICAL FIELD

This invention relates generally to two-way radio frequency communication systems, and more specifically to battery operated variable power transceivers operating with such systems, and is particularly directed toward transmitter power control during transmissions between two or more battery operated variable power transceivers.

BACKGROUND ART

Numerous techniques exist to vary the power of a transmitter or transceiver operating within a communication system. For example, it is known that battery powered transceivers (subscriber units) may be instructed by a base unit (or repeater) to increase or decrease their transmitter power. Accordingly, upon receipt of an appropriate command code, the battery powered transceiver adjusts its transmitter power (up or down) by a predetermined amount. In this way, the operational life of the battery power subscriber units may be increased by permitting transmissions at reduced power when the battery powered subscriber units are near the base unit (or repeater).

In many situations, however, the major share of communication activity takes place directly between subscriber units (i.e., subscriber-to-subscriber), and not subscriber-to-base. Thus, the energy saving advantage is lost at a time when it is most critical to insure maximized operational transceiver life.

SUMMARY OF THE INVENTION

Accordingly, it is an object of the present invention to provide the advantages of transmitter power control in subscriber-to-subscriber communication.

Briefly, according to the invention, the initial transmission from one subscriber to another subscriber is transmitted at full power. The receiving unit measures the received signal strength and returns a code representing this value in a reply message, which is also transmitted at full power. The signal strength of the reply message is determined and may be sent to the replying subscriber unit in a subsequent transmission, which may now be accomplished at a reduced power level. Thereafter, both subscribers may modify their respective transmitter power levels during subsequent transmissions to minimize power (i.e., battery) consumption and maximize the operational life of the subscriber unit.

DETAILED DESCRIPTION OF THE PREFERRED EMBODIMENT

Figure 1:
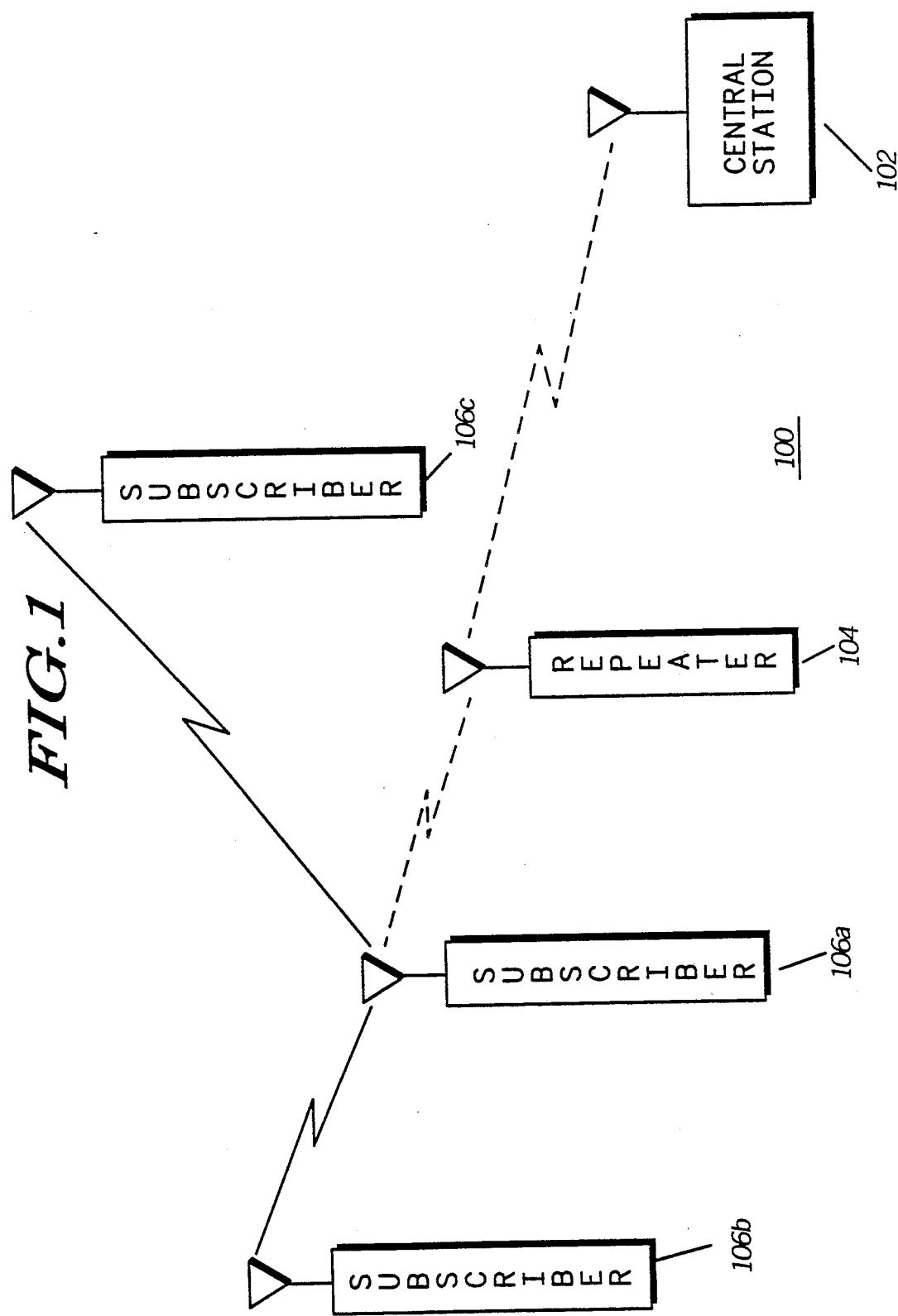
FIG. 1 is a block diagram of a communication system in accordance with the present invention.

Referring to FIG. 1, there is shown a block diagram of a communication system 100 in accordance with the present invention. The communication system 100 is comprised of a central (or base) station 102 that may communicate directly (or via a repeater 104) with a plurality of subscriber units (three shown). The subscriber units may be portable units, mobile units, or control stations. As used herein, a portable subscriber unit is designed to be carried on or about the person; a mobile subscriber unit is designed to be installed in vehicles; and a control station is a permanent or semi-permanent installation in a building or other fixed location. The advantages of the present invention are chiefly exploitable by portable subscriber units, which typically are battery powered hand-held transceivers.

In FIG. 1, the central station 102 is shown communicating with the subscriber unit 106a via a repeater 104. In this situation, it is known for the repeater 104 to measure the incoming signal strength and append it to the message transmitted to the central station 102. In this way, the central may send a command via the repeater to the subscriber unit to increase or decrease its transmitter power level. Alternately, this information could be stored locally and transmitted to the subscriber unit 106a with the next message directed towards the subscriber. When the central station 102 communicates directly with subscriber units, the central may measure the received signal strength itself and return a command code instructing the subscriber unit to increase or decrease its transmitter power in order to facilitate intelligible communication. By reducing the transmitter power to the minimum level needed to insure intelligible communication, the lifetime of the battery, and hence the subscriber unit, is maximized.

In many situations, the transmissions from portable subscriber units are directed towards other portable units and not towards the central station 102. For example, public safety officers such as police and firemen typically communicate with each other via portable radios once they arrive at the scene of an incident (for example, a building fire or airline accident). Most of the communications are directed locally in an effort to coordinate the activities of the firemen and police officers with relatively few communications being directed towards the central station 102. The present invention maintains the battery-savings advantages of power control in subscriber-to-subscriber communications such as between two individual subscribers 106a and 106b, or communication between a group of subscriber units 106a-106c.

Figure 2:
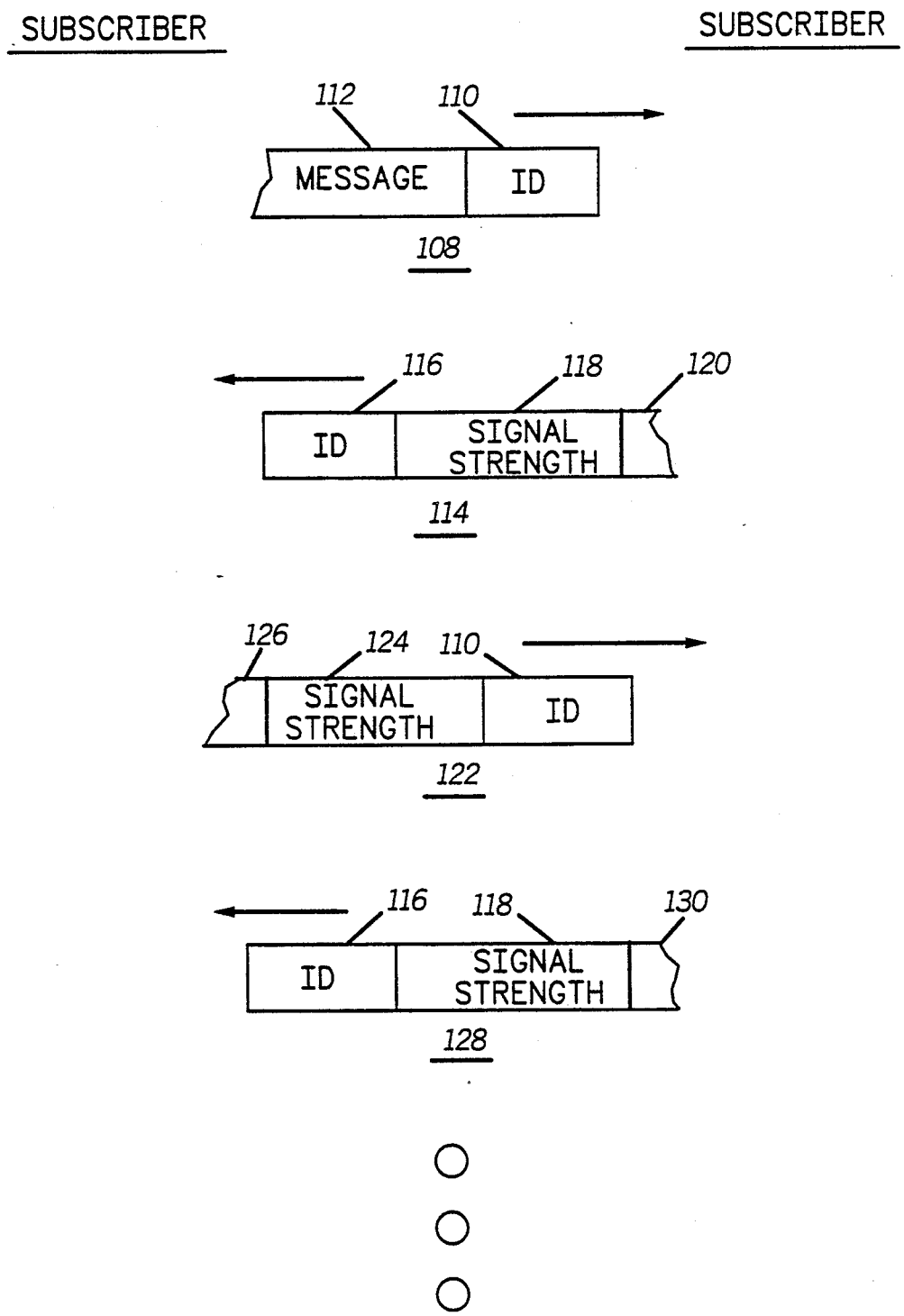
FIG. 2 is an illustration of the signaling protocol of the present invention.

Referring to FIG. 2, the preferred protocol to achieve power control is illustrated. Each time a subscriber unit transmits to a new subscriber unit (i.e., a subscriber having a different identification (ID) code), the message is transmitted at full power. This assures the greatest possible communication range, and is designed to insure that the initial message will be received by its intended party. The initial message 108 is comprised of an identification portion 110, which comprises at least the ID of the transmitting (or calling) party. Following this, a message 112 may be transmitted to the receiving subscriber. The receiving subscriber measures the received signal strength of the incoming message 108 and returns a value representing the signal strength in a reply message 114. Preferably, the instantaneous signal strength is measured periodically (i.e., every two seconds) using known techniques, and an average value is determined that represents the received signal strength value of the entire message. In this way, temporary fades in the message signal strength may be averaged out of the overall measurement.

The replay message 114 is also transmitted at full power since the receiving unit is unaware of the distance between the subscriber units. Preferably, the reply message 114 includes an ID portion 116, the signal strength code 118, and the message 120 constituting the reply. The original calling party measures the incoming signal strength (as described above) of the reply message 114 and formulates a code 124 representing the signal strength of the reply message. If the original caller desires to continue the communication, subsequent transmissions may be made at a reduced power level in accordance with the signal strength code 118 received in the reply message 114. Thus, the subsequent message 122 includes the ID portion 110, the signal strength portion 124 and a message 126. In a similar manner the called subscriber unit may now respond (transmission 128) at a reduced power level since it has received the signal strength code 124. This procedure may continue indefinitely with each subscriber unit adjusting its transmitter power (up or down) in accordance with signal strength values 118 and 124 transmitted back and forth between subscriber units. In this way, as the portable units move during the conversation, the transmitter power is maintained at a level that insures intelligible communication, while maximizing battery life.

In addition to individual subscriber-to-subscriber communication, transmissions often take place between groups of subscribers that have been arranged into a talk-group. That is, it is common for a plurality of the subscribers to have a common talk-group identification code so that a transmission by any one subscriber is heard by all of them. Assuming the subscribers 106a–106c are arranged into a common talk-group, a group transmission by subscriber 106a would be heard by subscribers 106b and 106c. If subscriber 106c were to respond to the transmission, the protocol for selective calls would provide effective power control and battery life maximization since subscriber 106c is operating at the greatest distance from subscriber 106a. However, if subscriber 106b were to respond, the power level returned to subscriber 106a from the closer subscriber may cause the transmitter power of the subscriber 106a to be reduced such that subscriber 106c would be unable to receive an intelligible signal. Accordingly, for group calls, the present invention contemplates that each subscriber unit will store one or more received signal strength values cross referenced to the subscriber units that generated the measured message. As other members of the group transmit, the lowest received signal strength (generated by the furthest subscriber unit) is retained so that the transmitter power level will be adjusted such that the furthest subscriber will be able to received an intelligible message. Thus, while the transmitter power could be further reduced by transmitting in a selective call mode, the present invention tempers, somewhat, total possible energy savings to insure effective group call communications. In this way, battery life savings is balanced against the need for a reliable communications in a group call context.

Figure 3:
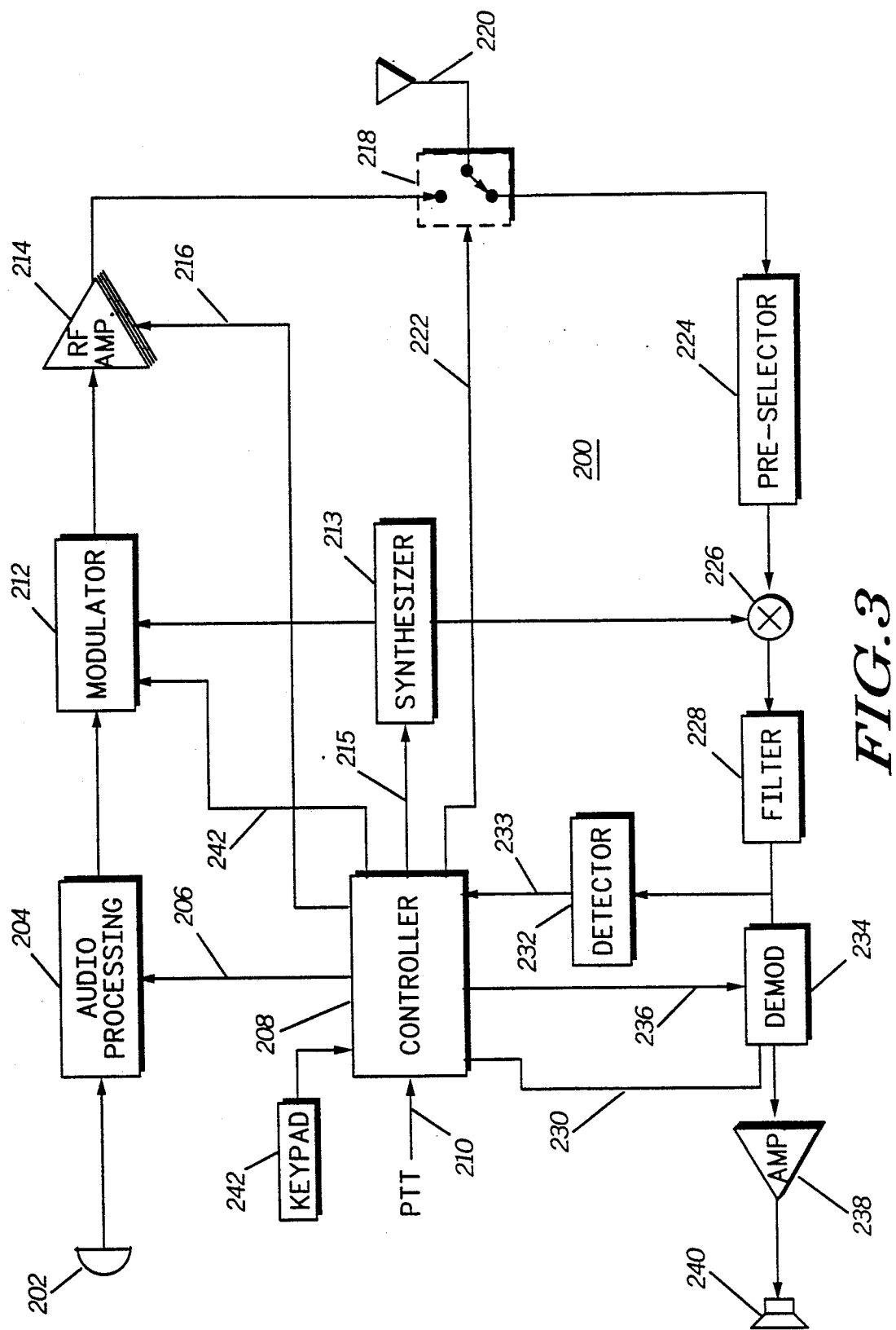
FIG. 3 is a block diagram of a subscriber unit of FIG. 1.

Referring to FIG. 3, a block diagram of a subscriber unit 200 in accordance with present invention is shown. Audio energy impressed upon a microphone 202 is received and processed by an audio processing portion 204, which is activated (206) by the controller 208. The controller 208 comprises the heart of the subscriber unit 200 and will activate the audio processing portion 204 in response to a push-to-talk (PTT) switch input 210. The processed audio is forwarded to a modulator 212, which accepts as a second input the output of a synthesizer 213 (optionally, the synthesizer 213 could be directly modulated as is known in the art). The synthesizer is programmed (215) by the controller 208 to the desired transmission frequency. The modulated signal is applied to a radio frequency (RF) power amplifier 214, which has a power level control line 216 to adjust the transmitter power in accordance with the commands of the controller 208 (typically, the RF power amplifier 214 may include an automatic level control circuit). The amplified signal is routed to an antenna 220 via an antenna switch 218, which is controlled (222) by the controller 208.

When receiving, the antenna 220 is coupled to a preselector 224 via the antenna switch 218. The preselector 224 comprises a filter, which band-limits the frequency spectrum to a band of interest for the receiver. The filtered output of the preselector 224 is routed to a mixer 226, which accepts as a second input the signal from the synthesizer 213 to down convert the received signal. The output of the mixer 226 is coupled to a filter 228, which further band-limits the signal to a suitable intermediate frequency (IF) as is known in the art. After filtering the received information is routed to a demodulator 234. When activated (236) by the controller 208, the demodulator supplies data (such as signal strength information) to the controller 208 (via the data line 230), while audio information is routed to an audio amplifier 238 and provided to a speaker 240 to be broadcast to the operator.

Additionally, the subscriber unit 200 includes the detector 232, which measures the received signal strength at the output of the filter 228. The signal strength information is routed to the controller 208 via the signal strength line 233. In this way, the controller 208 can return the signal strength information to another subscriber unit by routing (242) the signal strength information to the modulator 212 for transmission.

Any signal strength information received (230) by the controller 208 is processed to determine whether to increase or decrease the power of the subscriber by adjusting (216) the RF power amplifier 214. In another aspect of the present invention, the automatic operation of the power control system can be defeated via a key pad 242, which will program the controller 208 to disregard the signal strength information received on the data line 230. Additionally, the central 102 may transmit a command code disabling the automatic power reduction provided by the present invention. In this way, an operator supervising the central station would be able to receive all subscriber communications as they would be transmitted at full power.

Figure 4:
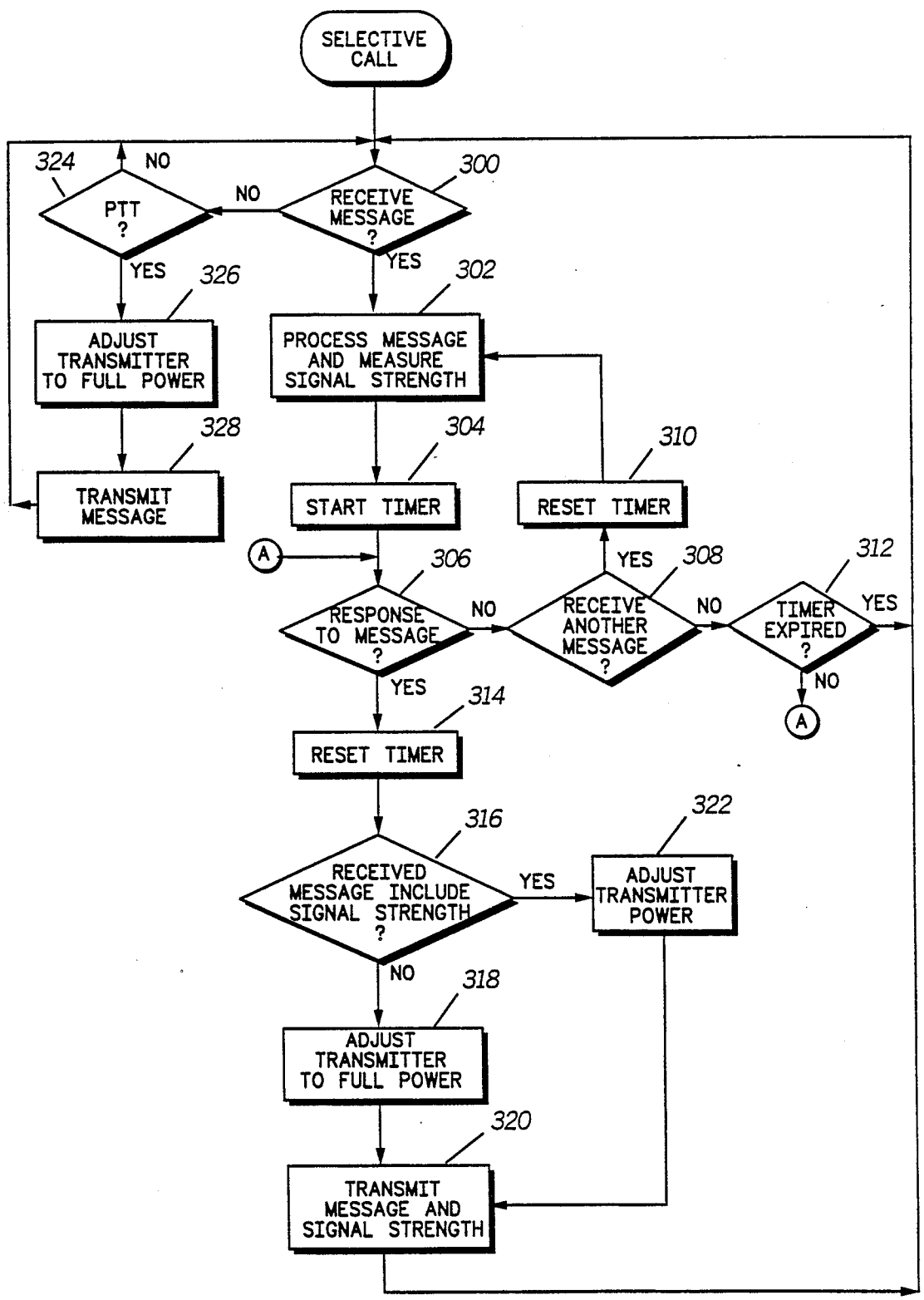
FIG. 4 is a flow diagram illustrating the operational steps performed by a subscriber unit to process a selective call in accordance with the present invention.

Referring to FIG. 4, a flow diagram illustrating the selective call operation of the subscriber unit 200 is shown. A selective (or private) call comprises a communication between two subscribers (106a and 106b for example). The selective call routine begins in decision 300, which determines whether a message has been received. If so, the message is processed and the signal strength of the message is measured in step 302. As previously mentioned, the instantaneous signal strength is measured periodically (i.e., every two seconds) using known techniques, and an average value is determined that represents the received signal strength value of the entire message. Following received message processing and measurement, the routine proceeds to step 304, where a response timer is started. According to the invention, if the subscriber does not respond within a predetermined time interval, it is assumed that the other subscriber may have moved such that the signal strength information is no longer accurate. Accordingly, the next transmission is made at full power to ensure message intelligibility.

After timer activation, decision 306 determines whether the operator intends to repond to the received message by examining the PTT line for an activation. If the PTT line has not been activated, the routine proceeds to decision 308, which determines if a second message has been received. If so, the timer is halted and reset (step 310) and the routine returns to step 302 for received message processing and measurement. Conversely, if no other message has been received, the routine proceeds to decision 312, which determines whether the timer has expired. If not, the routine returns to reference letter A (decision 306), forming an operational loop with decisions 306 and 308. The loop ends when the timer expires, when the PTT switch has been activated, or another message is received. Assuming PTT activation, the routine proceeds to step 314, which resets the timer. Following this, decision 316 determines whether the last received message contained signal strength information. If not, the routine proceeds to step 318, which adjusts the transmitter to its full power level. Conversely, if decision 316 determines that signal strength information was received in the last received message, the routine proceeds to step 322, where the transmitter power is adjusted (up or down) as required in accordance with the received signal strength information. In either event, the routine ultimately proceeds to step 320, which transmits a reply message together with the signal strength information determined in step 302.

Assuming now that the determination of decision 300 is that a message was not received, the routine proceeds to decision 324, which determines whether the PTT switch has been activated. If so, the subscriber desires to communicate without having first received signal strength information from another subscriber unit. Therefore, in accordance with the present invention, the transmission is made at full power. Accordingly, the routine proceeds to step 326, which adjusts the transmitter to its full power level, after which the message is transmitted in step 328. In this way, battery life is maximized, while insuring effective communication directly between subscriber units.

Figure 5:
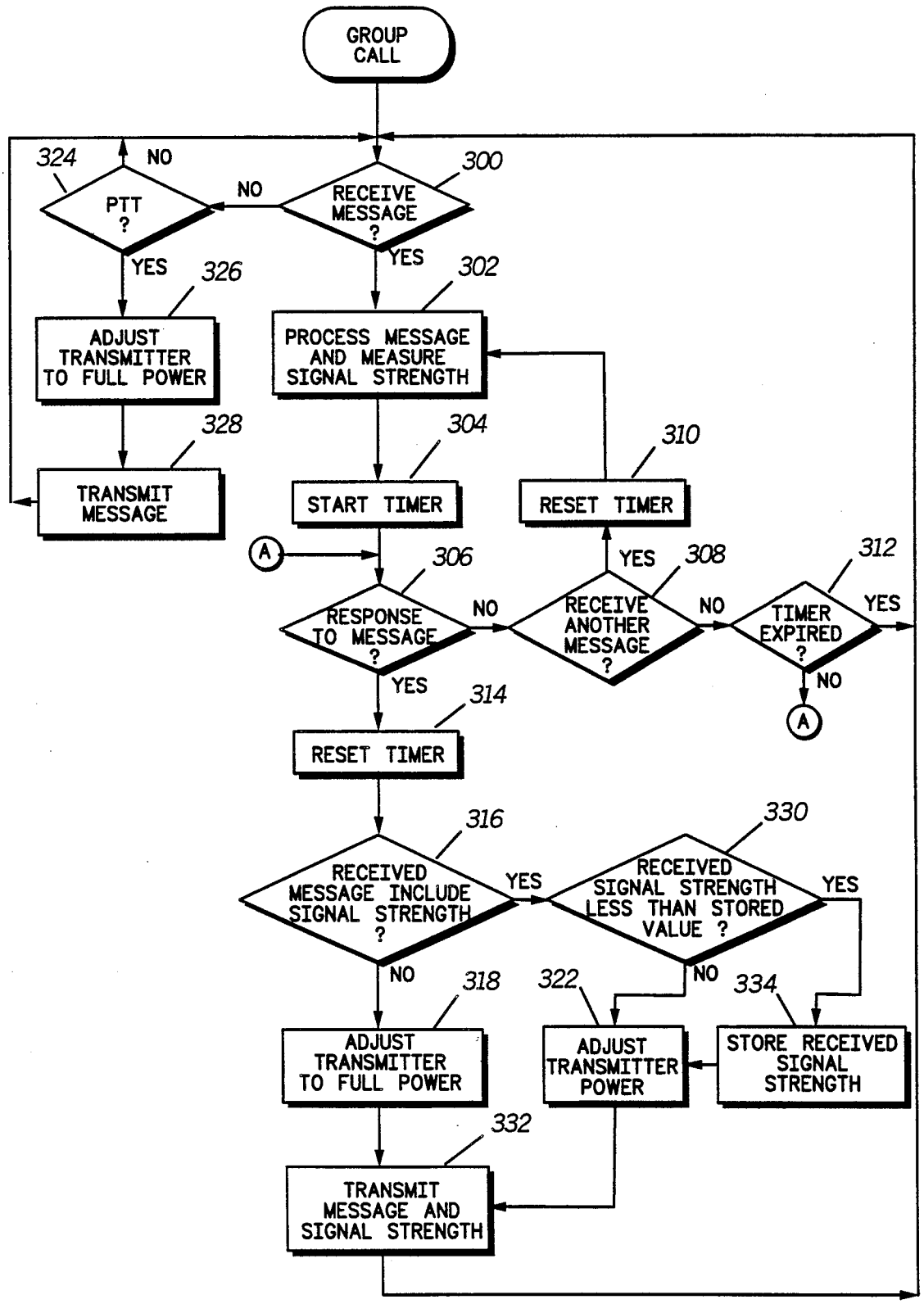
FIG. 5 is a flow diagram illustrating the operational steps performed by a subscriber unit to process a group call in accordance with the present invention.

Referring to FIG. 5, a flow diagram illustrating the group call operation of the subscriber unit 200 is shown. A group call comprises a communication between two or more subscribers (106a–106c for example). Similarly to the selective call routine (FIG. 4), the group call routine begins in decision 300, which determines whether a message has been received. If so, the message is processed and the signal strength of the message is measured in step 302. As previously mentioned, the instantaneous signal strength is measured periodically (i.e., every two seconds) using known techniques, and an average value is determined that represents the received signal strength value of the entire message. Following received message processing and measurement, the routine proceeds to step 304, where a response timer is started. According to the invention, if the subscriber does not respond within a predetermined time interval, it is assumed that the other subscriber may have moved such that the signal strength information is no longer accurate. Accordingly, the next transmission is made at full power to ensure message intelligibility.

After timer activation, decision 306 determines whether the operator has responded to the received message by examining the PTT line for an activation. If the PTT line has not been activated, the routine proceeds to decision 308, which determines a second message has been received. If so, the timer is halted and reset (step 310) and the routine returns to step 302 for received message processing and measurement. Conversely, if no other message has been received, the routine proceeds to decision 312, which determines whether the timer has expired. If not, the routine returns to reference letter A (decision 306), forming an operational loop with decisions 306 and 308. The loop ends when the timer expires, when another message is received, or when the PTT switch has been activated. Assuming PTT activation, the routine proceeds to step 314, which resets the timer. Following this, decision 316 determines whether the last received message contained signal strength information. If not, the routine proceeds to step 318, which adjusts the transmitter to its full power level. Conversely, if decision 316 determines that signal strength information was received in the last received message, the routine proceeds to decision 330, which determines whether the last received signal strength value is less than a stored signal strength value. According to the invention, the lowest signal strength value is retained by the subscriber unit so that the transmitter power will be adjusted so as to insure that the furthest subscriber unit receives an intelligible signal. Thus, if the determination of decision 330 is that the last received signal strength value is lower that the stored value, the routine proceeds to step 334, where the lower last received value is stored. Following this, the routine proceed to step 322, where the transmitter power is adjusted (up or down) as required in accordance with the stored received signal strength information. In either event, the routine ultimately proceeds to step 332, which transmits the subscriber unit's ID code together with a reply message together and the signal strength information determined in step 302.

Assuming now that the determination of decision 300 is that a message was not received, the routine proceeds to decision 324, which determines whether the PTT switch has been activated. If so, the subscriber desires to communicate without having first received signal strength information from another subscriber unit. Therefore, in accordance with the present invention, the transmission is made at full power. Accordingly, the routine proceeds to step 326, which adjusts the transmitter to its full power level, after which the message is transmitted in step 328. In this way, battery life is maximized, while insuring effective communication between the several subscriber units.

What is claimed is:

1. A method for adjusting the power of a transmitter during a subscriber to subscriber call, comprising the steps of:

at a first subscriber unit:

(a) transmitting a first message at a first power level to a second subscriber unit;

(b) receiving a reply message from said second subscriber unit, said reply message including a code representing received signal strength as determined by said second subscriber unit;

(c) determining a value representing received signal strength of said reply message;

(d) determining whether transmitter power should be adjusted based upon whether a predetermined time interval has expired;

(e) transmitting a second message at a second power level to said second subscriber unit when step (d) determines transmitter power should be adjusted, else transmitting said second message to said second subscriber unit at said first power level, said second message including said value representing received signal strengtgh of said reply message.

2. The method of claim 1, wherein step (a) comprises transmitting a first message at full power level to a second subscriber unit.

3. The method of claim 1, wherein step (c) comprises determining whether, and to what extent, transmitter power should be adjusted.

4. The method of claim 1, wherein step (c) comprises determining whether transmitter power should be adjusted based upon said code representing received signal strength as determined by said second subscriber unit.

5. The method of claim 1, which includes the steps of:
at said second subscriber unit:
(a) receiving said first message from said first subscriber unit;
(b) determining said code representing received signal strength of said first message;
(c) transmitting said reply message to said first subscriber unit, said reply message including said code representing received signal strength of said first message.

6. The method of claim 1, which includes the step of:
(b1) comparing said code representing received signal strength to stored information representing previously received signal strength data; and
(b2) replacing said stored information with said code when said code represents a signal strength having decreased magnitude as compared to said stored information.

7. The method of claim 1, wherein steps (a) and (b) both comprise transmitting and receiving respective subscriber identification codes along with any said code representing received signal strength.

8. A method for adjusting the power of a transmitter during a subscriber to subscriber call, comprising the steps of:
at a first subscriber unit:
(a) transmitting a first message at a first power level and a first identification code to a second subscriber unit;
(b) receiving a reply message from said second subscriber unit, said reply message including a second identification code and a code representing received signal strength as determined by said second subscriber unit;
(c) determining a value representing received signal strength of said reply message;
(d) determining whether transmitter power should be adjusted;
(e) transmitting a second message at a second power level to said second subscriber unit when step (c) determines transmitter power should be adjusted, else transmitting said second message to said second subscriber unit at said first power level, said second message including said value representing said received signal strength of said reply message;
at said second subscriber unit:
(a) receiving said first message and said first identification code from said first subscriber unit;
(b) determining a code representing received signal strength of said first message;
(c) transmitting said reply message to said first subscriber unit, said reply message including said second identification code and code representing said received signal strength of said first message; and,
(d) receiving said second message from said first subscriber unit.

9. A method for adjusting the power of a transmitter during a subscriber to subscriber call, comprising the steps of:
at a first subscriber unit:
(a) transmitting a first message at a first power level and a first identification code to a second subscriber unit;
(b) receiving a reply message from said second subscriber unit, said reply message including a second identification code and a code representing received signal strength as determined by said second subscriber unit;
(c) determining a value representing received signal strength of said reply message;
(d) determining whether transmitter power should be adjusted, and adjusting said transmitter power to a second power level in accordance with said code, when it is determined to adjust said power level, said second power level being prohibited from being adjust below a predetermined threshold;
(e) transmitting a second message at a second power level to said second subscriber unit when step (d) determines transmitter power should be adjusted, else transmitting said second message to said second subscriber unit at said first power level, said second message including said value representing received signal strength of said reply message.

10. A subscriber unit capable of adjusting transmitter power during a subscriber to subscriber call, comprising:
means for transmitting a first message at a first power level and a first identification code to a second subscriber unit;
means for receiving a reply message from said second subscriber unit, said reply message including a second identification code and code representing received signal strength as determined by said second subscriber unit;
means for determining a value representing received signal strength of said reply message;
determining means for determining whether transmitter power should be adjusted;
means for transmitting a second message at a second power level to said second subscriber unit when said determining means determines transmitter power should be adjusted, and for transmitting said second message to said second subscriber unit at said first power level when said determining means determines transmitter power should not be adjusted, said second message including said value representing received signal strength of said reply message.

* * * * *